(12) United States Patent
Ikuta

(10) Patent No.: US 6,821,069 B2
(45) Date of Patent: Nov. 23, 2004

(54) ANCHOR DEVICE

(75) Inventor: Kazuichi Ikuta, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 51 days.

(21) Appl. No.: 10/288,381

(22) Filed: Nov. 6, 2002

(65) Prior Publication Data

US 2003/0118420 A1 Jun. 26, 2003

(30) Foreign Application Priority Data

Nov. 7, 2001 (JP) ........................................ 2001-380728
Sep. 6, 2002 (JP) ........................................ 2002-301103

(51) Int. Cl.[7] ............................................... F16B 21/00
(52) U.S. Cl. ........................................ 411/344; 411/340
(58) Field of Search .................... 411/340, 344–346, 411/546, 312, 902, 903, 913, 999, 508–510

(56) References Cited

U.S. PATENT DOCUMENTS

| | | | |
|---|---|---|---|
| 2,302,359 A | * 11/1942 | Wagner | 411/312 |
| 4,075,924 A | * 2/1978 | McSherry et al. | 411/112 |
| 4,079,655 A | 3/1978 | Roberson, Jr. | |
| 4,294,156 A | * 10/1981 | McSherry et al. | 411/345 |
| 6,161,999 A | * 12/2000 | Kaye et al. | 411/344 |
| 6,287,064 B1 | * 9/2001 | Jhumra et al. | 411/175 |

* cited by examiner

*Primary Examiner*—William L. Miller
(74) *Attorney, Agent, or Firm*—Wenderoth, Lind & Ponack, L.L.P.

(57) ABSTRACT

An anchor device is provided which makes it possible to fasten various members or instruments to a wall to the back of which hands cannot reach with a bolt. The anchor device includes an inserting member molded of a synthetic resin, a nut mounted to the tip of the inserting member, and a tubular seating member mounted on the inserting member. The inserting member has a bag-like portion integrally formed at the tip of an elongated trough-like trunk portion having a semicircular section through a bendable portion. The nut, which has a semicircular section, is received in the bag-like portion. By inserting the anchor device into a hole formed in a wall member, it fixes an article to be fastened by use of a bolt.

8 Claims, 7 Drawing Sheets

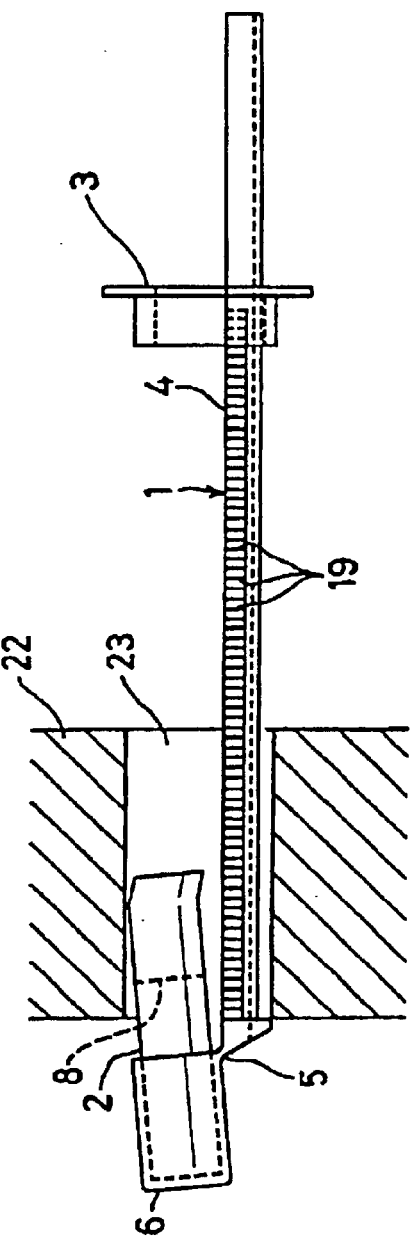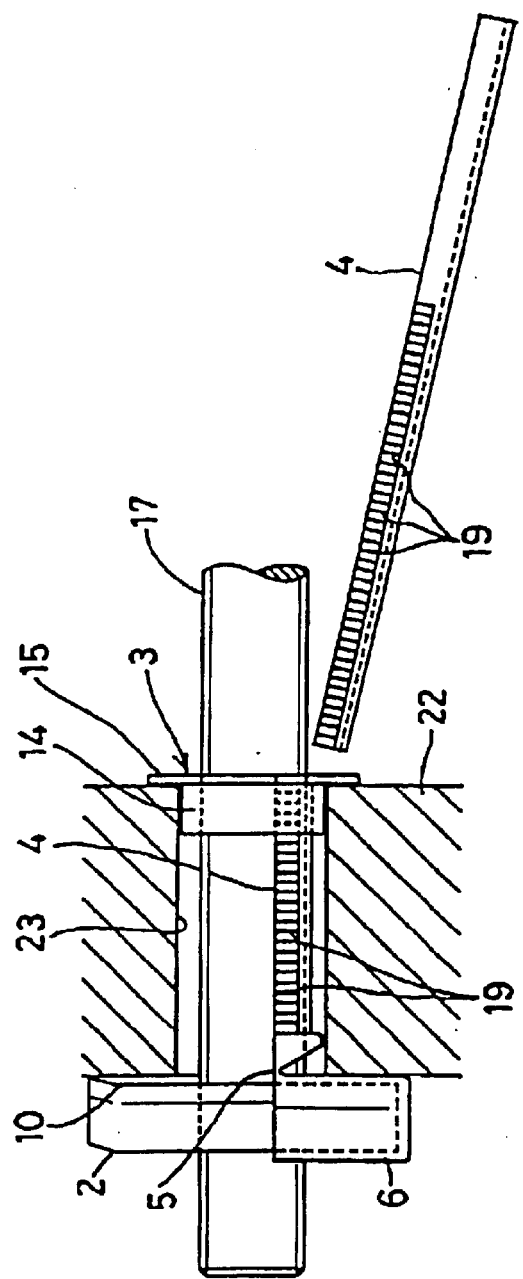
FIG. 1(A)
FIG. 1(B)

ANCHOR DEVICE

BACKGROUND OF THE INVENTION

This invention relates to an anchor device which makes it possible to fasten a member or instrument to a surface of a wall to the back of which hands cannot reach.

For example, in order to fasten a member or instrument with a bolt to e.g. a wall surface in which it is impossible to form a threaded hole, it is necessary to position a nut on the back of the wall surface.

Thus, if it is impossible to insert a hand to the back of a wall, an anchor device is used which makes it possible to position a nut on the back of the wall surface by inserting it from the front surface of the wall surface.

A conventional anchor device is shown in U.S. Pat. No. 4,079,655 in which a wing-shaped nut formed by pressing a thin metal plate is held by an arm member that can be folded in two. The arm member, which has been folded in two, is inserted into a hole formed in a wall member from its front side with the nut threaded on a bolt, and the bolt is threaded with the arm member opened on the back of the wall member.

Such an anchor device has a problem in that because the wing-shaped nut is thin in wall thickness and weak in strength, deformation or breakage tends to occur due to loads. Thus, strong fastening is impossible and the structure is complicated, which increases the manufacturing cost.

Structurally, there was a problem that since it is necessary to form a hole that is fairly large in diameter compared to the outer diameter of the bolt in the wall member, according to the size of an instrument to be mounted, it was impossible to use such a conventional anchor device.

In order to solve these problems, the present inventor proposed an anchor device in which a bag-like portion is provided at the tip of a trough-like portion through a bendable portion, a metallic plate nut is inserted in the bag-like portion and a seating member is fitted on the trough-like trunk portion so as to be able to be retained. However, if the retaining state between the trough-like trunk portion and the seating member is made more stiff, in other words, the seating member is made less likely to come out, there arises a problem that resistance when the seating member is inserted increases, so that workability is lowered. Besides, there is an object of making a hole formed in a wall member as small as possible.

An object of this invention is to provide an anchor device which uses a nut that is thick in wall thickness, which permits strong fastening, which is simple in structure and low in the manufacturing cost, and which has improved workability.

SUMMARY OF THE INVENTION

According to a first aspect this invention, there is provided an anchor device comprising an inserting member having a trough-like trunk portion and a bag-like portion provided at the tip of the trough-like trunk portion through a bendable portion, the bag-like portion extending in a direction perpendicular to the axis of the trough-like trunk portion, a nut inserted in the bag-like portion and having a threaded hole in a portion protruding from the bag-like portion, a ring-shaped seating member fitted on the trough-like trunk portion, and retaining means for retaining the seating member so as not to come out of the trough-like trunk portion, the retaining means comprising a plurality of serrations formed on the trough-like trunk portion continuously in the longitudinal direction on both edges of the outer periphery of the trough-like trunk portion and a protrusion formed on the inner periphery of the seating member so as to contact with both edges of the trough-like trunk portion.

In a second aspect of the invention, there is provided an anchor device according to the first aspect of the invention characterized in that near the bottom of the outer periphery of the trough-like trunk portion, a thin deflecting portion is provided so as to extend in a longitudinal direction.

In a third aspect of the invention, there is provided an anchor device according to the first or second aspect of the present invention, wherein said nut has a substantially semicircular section, and the bag-like portion has a semicircular hole to receive the nut, and has a side facing the bendable portion, and the side face is a flat surface.

BRIEF DESCRIPTION OF THE DRAWINGS

Other features and objects of the present invention will become apparent from the following description made with reference to the accompanying drawings, in which:

FIG. 1A is a longitudinal sectional view showing how the anchor device according to this invention is inserted into a wall hole;

FIG. 1B is a similar view showing the same in a later stage;

DETAILED DESCRIPTION OF THE PREFERRED EMBODIMENT

Figure 2:
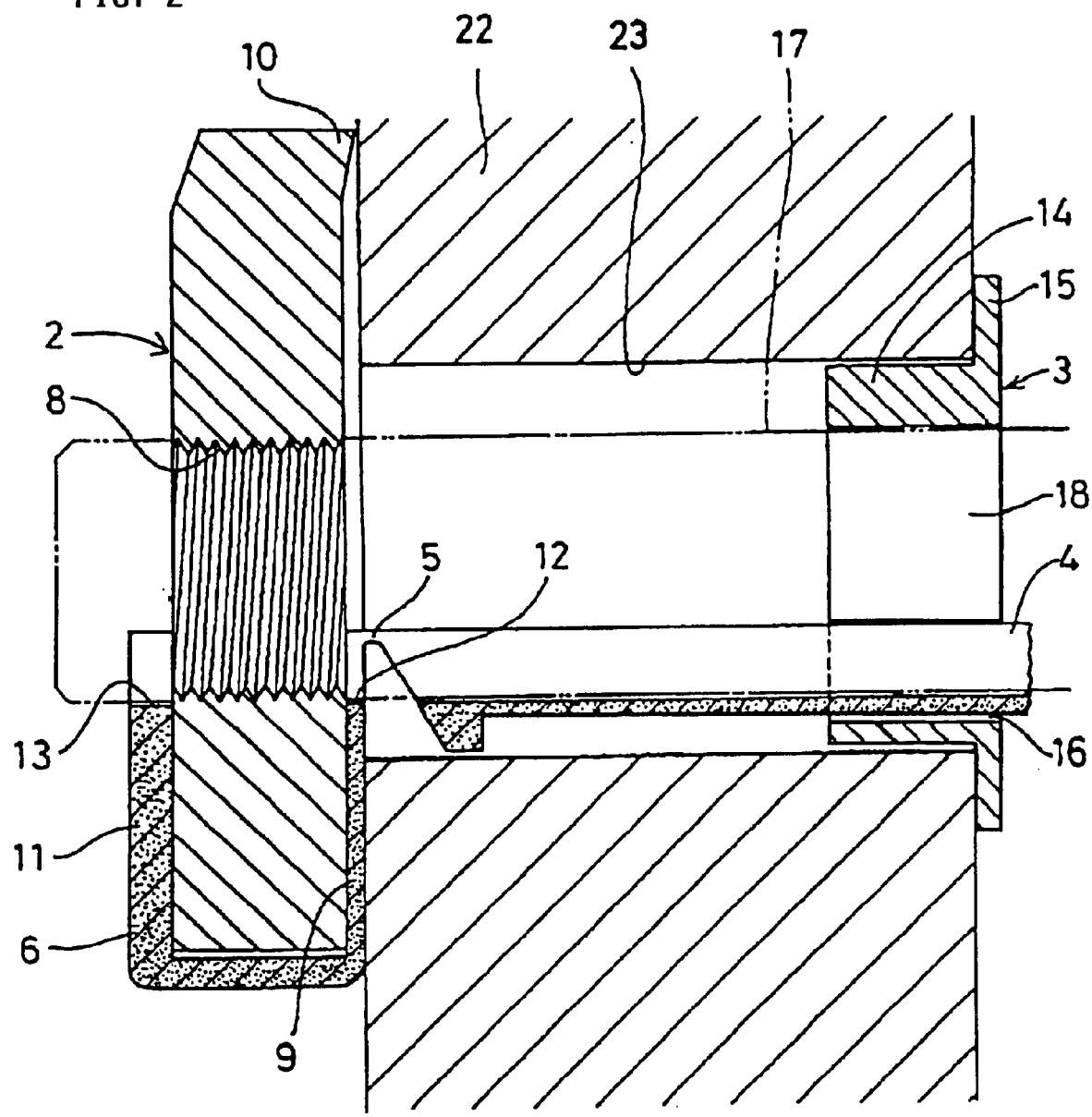
FIG. 2 is a partial enlarged longitudinal sectional view of the same.

Hereinbelow, the embodiments of this invention will be described with reference to the drawings.

The anchor device of the embodiment shown. in FIG. 1 comprises an inserting member 1 molded from a synthetic resin, a nut 2 mounted to the tip of the inserting member 1, and a tubular seating member 3 fitted on the inserting member 1.

The inserting member 1 has a bag-like portion 6 integrally formed at the tip of an elongated trough-like trunk portion 4 having a semicircular section, through a bendable portion 5. The portion 6 extends in a direction perpendicular to the axis of the trunk portion 4. The bag-like portion 6 has a semicircular hole 7 adapted to receive the nut 2. Its side facing the bendable portion 5 is a flat surface perpendicular to the axis of the trough-like trunk portion 4. The bag-like portion 6 is formed into a tube having a bottom to hold the nut 2. Both sides of its open top are integral with the top of the trough-like trunk portion 4 through the thin bendable portion 5.

The bag-like portion 6 is formed so that the semicircular hole 7 is perpendicular to the longitudinal direction of the trough-like trunk portion 4, and it is pivotable upward with the bendable portion 5 as a fulcrum.

The nut 2 is semicircular in section and is formed with a threaded hole 8 such that when inserted in the bag-like portion 6, the threaded hole 8 will extend therethrough in its portion protruding from the open top end of the bag-like portion 6.

The diameter of the threaded hole 8 is equal to or smaller than the inner diameter of the trough-like trunk portion 4, and in FIG. 2 in which the nut 2 is inserted in the hole 7 of the bag-like portion 6, the inner periphery of the trough-like trunk portion 4 is coaxial with the threaded hole 8. The top ends 12, 13 of the rear wall 9 and front wall 11 are arcuate. The top end 12 of the rear wall 9 is disposed at the tip of the trough-like trunk portion 4.

The seating member 3 is formed of plastic and comprises a cylindrical portion 14 fitted on the trough-like trunk portion 4 and a flange 15 provided at the rear end of the cylindrical portion 14. The inner periphery of the cylindrical portion 14 is formed so that its substantially lower half portion is a large-diameter portion 16 corresponding to the outer periphery of the trough-like trunk portion 4. The remaining upper half is a small-diameter portion 18 in which a bolt 17 fits.

On the outer peripheral surface of the trough-like trunk portion 4 and on the inner periphery of the large-diameter portion 16 of the seating member 3, a pair of engaging means are provided which permit movement of the seating member 3 relative to the trunk portion 4 and engage and hold the seating member 3 so as not to come out. The engaging means comprise a plurality of serrations 19 provided on the trunk portion 4 in the longitudinal direction and a protrusion 20 provided in the seating member 3 at the large-diameter portion 16 so as to engage the serrations 19. The serrations 19 have such a shape that one of the surfaces extending toward each apex is moderately inclined and the other rises substantially vertically, but a flat surface or a curved surface may be formed on each apex. The serrations 19 may have their height gradually increasing forwardly.

Also, at the outer peripheral bottom of the trough-like trunk portion 4, a thin deflecting portion 21 is provided so as to extend in the longitudinal direction.

The anchor device of this invention is structured as above. Next, how it is used will be described.

In FIGS. 1A, 1B and 2, a hole 23 having such an inner diameter that the cylindrical portion 14 of the seating member 3 fits is drilled in a wall member 22 to the back of which hands cannot reach. With the nut 2 inserted in the bag-like portion 6 of the inserting member 1, the bag-like portion 6 is pivoted upward at the bendable portions 5, and the nut 2 is held by hand so as to be laid flat substantially parallel to the axis of the trough-like trunk portion 4. The hole 23 formed in the wall member 22 is required to be as small as possible. The diameter of the hole 23 is determined by the width of the nut 2, and more accurately by the width of the bag-like portion 6 which houses the nut 2. However, if the width of the nut 2 is small, the strength of the nut decreases. Thus, these requirements are contradictory to each other. In the present invention, by making the cross-sectional shape of the nut 2 semicircular, it is possible to insert the nut 2, which has a large effective sectional area, in the small diameter. This made it possible to solve the abovementioned contradiction.

In this state, with the bag-like portion 6 in front, the trough-like trunk portion 4 is inserted into the wall hole 23 from the front surface of the wall member 22.

FIG. 1A shows an intermediate state of inserting. Since the bag-like portion 6 and the nut 2 tend to return to the original position by the restoring resilience of the synthetic resin forming the bendable portion 5, the bag-like portion 6 and the nut 2 which have been released from holding by hand, will pass through the hole 23 in an inclined state while abutting the upper surface of the wall hole 23.

When the bag-like portion 6 and the nut 2 completely pass through the wall hole 23 and are positioned on the back of the wall member 22, they will further return to the original position by the restoring resilience of the bendable portion 5. When the trough-like trunk portion 4 is pulled back, the rear wall 9 of the bag-like portion 6 and the nut 2 will abut the back of the wall member 22, so that it becomes impossible to pull out the trough-like trunk portion 4 with the threaded hole 8 of the nut 2 aligned with the wall hole 23.

Although a slope may develop between the top portion of the nut 2 and its bottom portion, which abuts the back of the wall member 22 through the rear wall 9 of the bag-like portion 6, no trouble will develop. However, a step 10 may be provided on the top of the nut 2 so that they will abut uniformly.

Next, as shown in FIG. 1B, with the inserting member 1 held, the fitted seating member 3 is moved forward to fit its cylindrical portion 14 in the wall hole 23.

When the seating member 3 is moved forward, the protrusion 20 on the seating member 3 moves while engaging the serrations 19 which are formed continuously in the longitudinal direction of the trough-like trunk portion 4 on both edges of its outer periphery. The protrusion 20 of the seating member 3 thus moves while surmounting the continuous serrations 19. Due to protrusion-to-serration friction, resistance is produced to the movement, so that advancement becomes difficult. In order to reduce the resistance, lowering the height of the protrusion is considered. However, if the height of the protrusion is lowered, an engagement would become loose, so that the effect of preventing the seating member 3 from coming out of the trough-like trunk portion 4 would decrease. According to the present invention, since the serrations 19 are provided on both edges of the outer periphery of the trough-like trunk portion 4, both edges of the outer periphery of the trough-like trunk portion 4 deflect inwardly and are resiliently deformed as shown by the arrows S in FIG. 3B, so that the distance between both edges shortens. Thus, it is possible to move the seating member 3 with a light force. If the resilience is insufficient, by providing a thin deflecting portion 21 near the bottom of the trough-like trunk portion 4 so as to extend in a longitudinal direction, it is possible to increase the resilience. In this way, the seating member 3 is moved until its flange 15 abuts the end face of the wall member 22 and is prevented from coming out of the trough-like trunk portion 4.

Next, the portion of the trough-like trunk portion 4 protruding from the seating member 3 is cut off with a cutter or the like. The bolt 17, which extends through an article to be fastened (not shown) which is laid on the surface of the wall member 22, is inserted through the small-diameter portion 18 into the hole 23, and then threaded into the threaded hole 8.

Figure 3A:
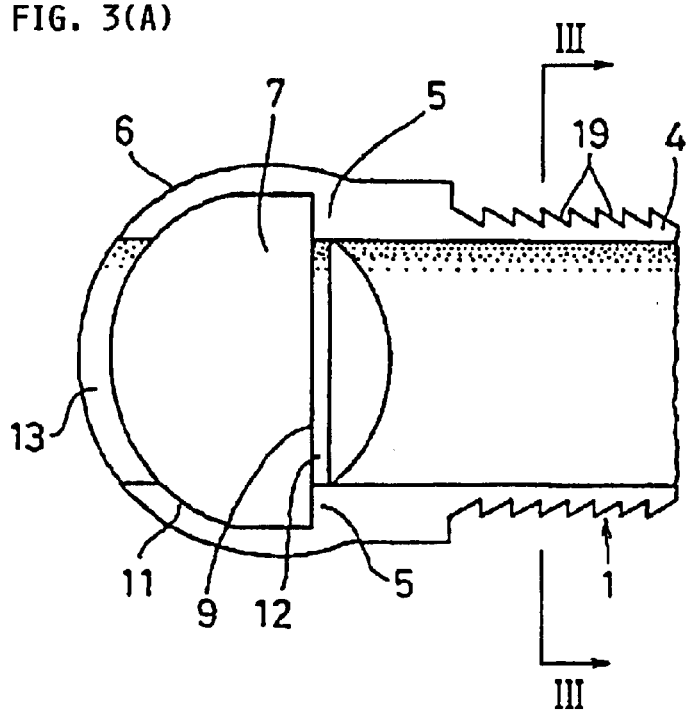
FIG. 3A is an enlarged plan view showing the tip of the inserting member.
Figure 3B:
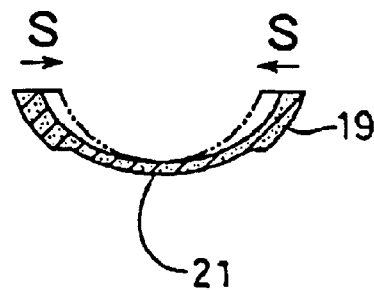
FIG. 3B is a sectional view along line III—III of FIG. 3A.
Figure 4A:
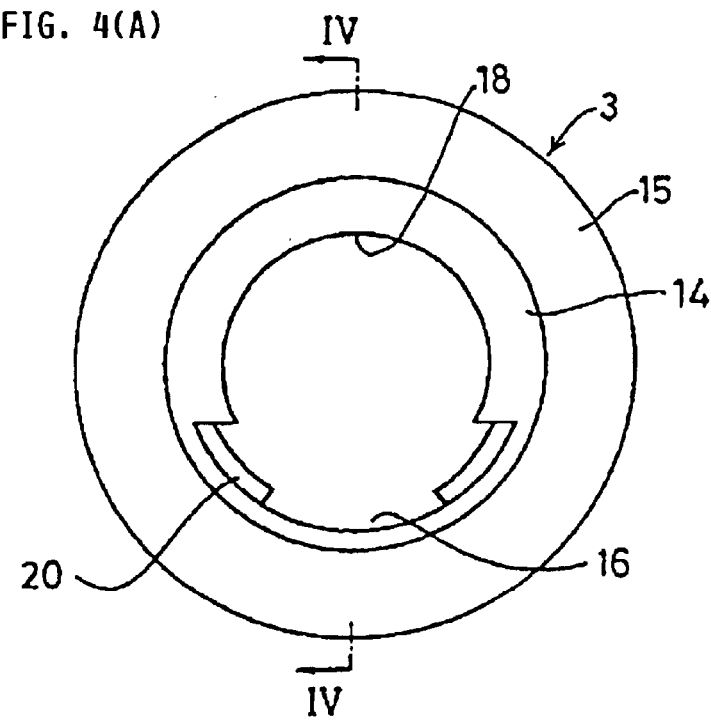
FIG. 4A is a front view of the seating member.
Figure 4B:
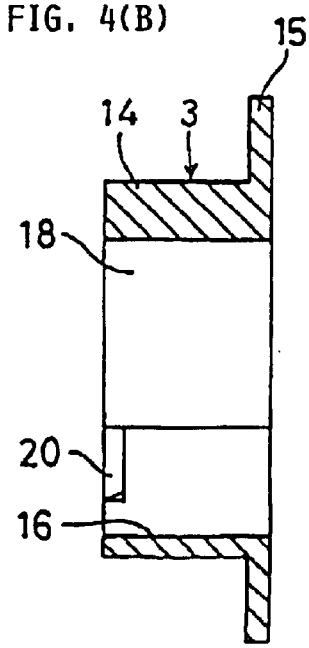
FIG. 4B is a sectional view along the arrow IV—IV of FIG. 4A.
Figure 5:
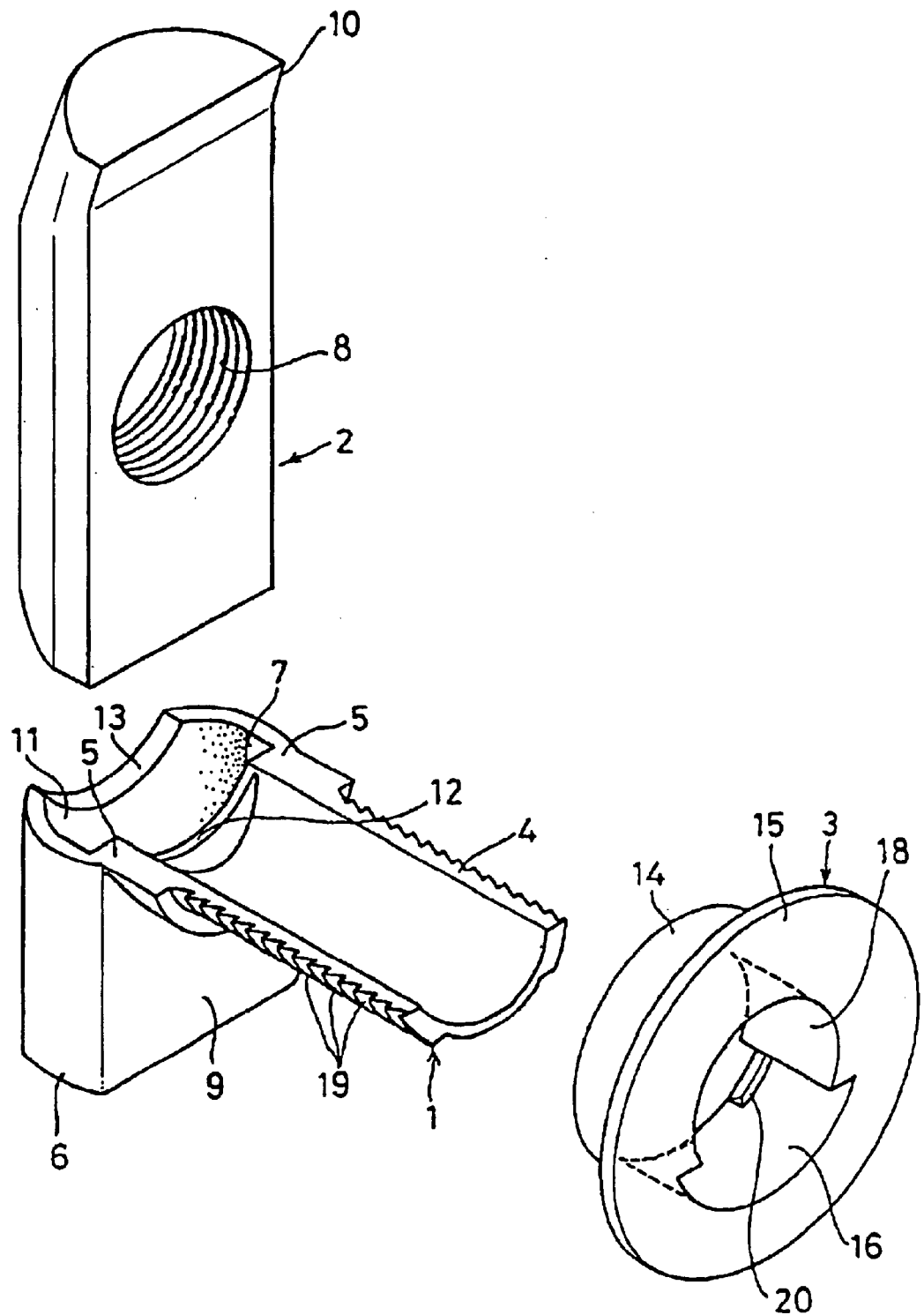
FIG. 5 is an exploded perspective view of the anchor device.

When the bolt 17 is inserted, the outer periphery of the bolt fills the inner peripheral surface of the trough-like trunk portion 4. Now the trunk portion 4 will become unable to be deformed inwardly as shown in FIG. 3B. Thus the engaged state between the seating member 3, which is now prevented from coming out of the trough-like trunk portion 4 as described above, and the trough-like trunk portion 4, is maintained strongly. When the tip of the bolt 17 abuts the nut 2 and is pushed forwardly, the engaged state tends to be released. But in the present invention, as described above, since the bolt 17 keeps both edges of the trunk portion 4 from being deformed inwardly, the engaged state is less likely to be released.

After abutting the nut 2, the bolt 17 pulls the nut toward the back of the wall member 22 due to the threaded engagement with the threaded hole 8 and presses the article to be fastened against the surface of the wall member 22 with its head. Thus it is possible to fix the article to be fastened to the wall member 22 with the bolt 17.

Figure 6:
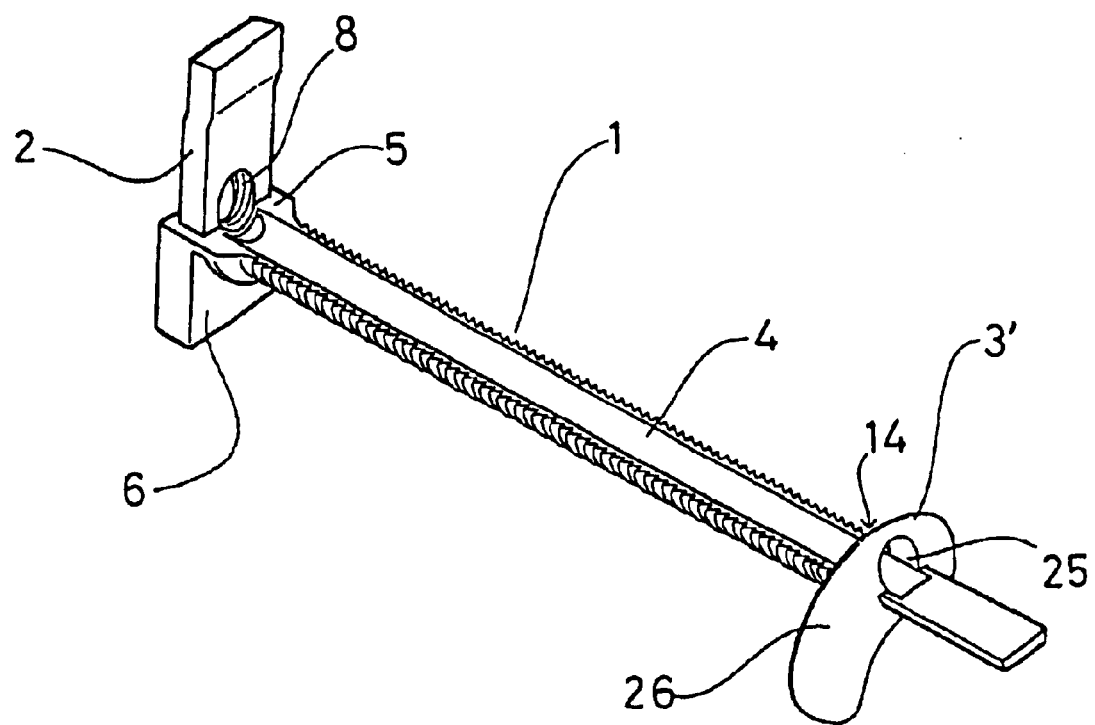
FIG. 6 is a perspective view showing a second embodiment of the anchor device according to this invention.
Figure 7:
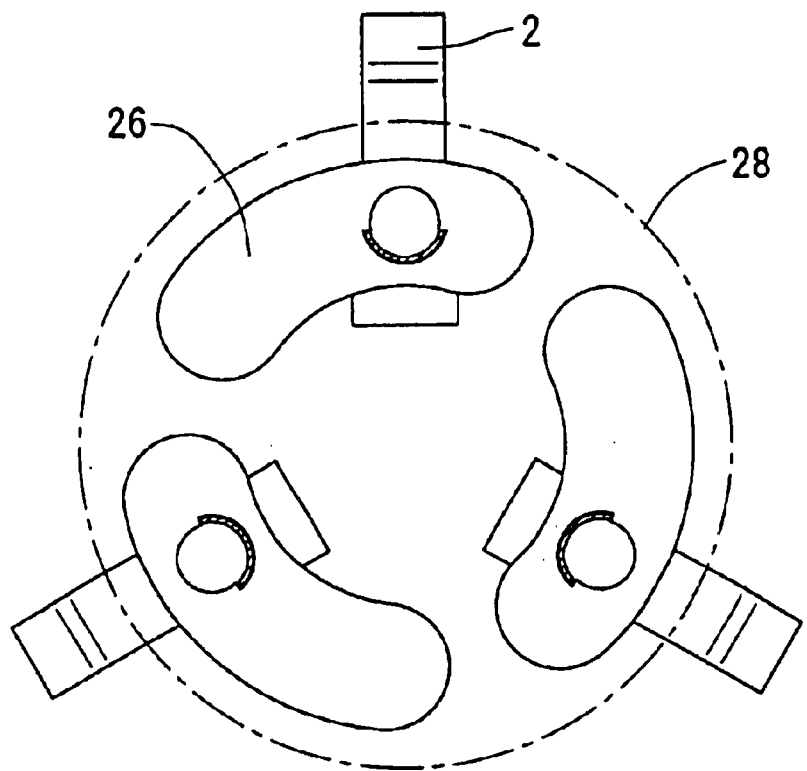
FIG. 7 is an explanatory view showing how the anchor device is used.
Figure 8:
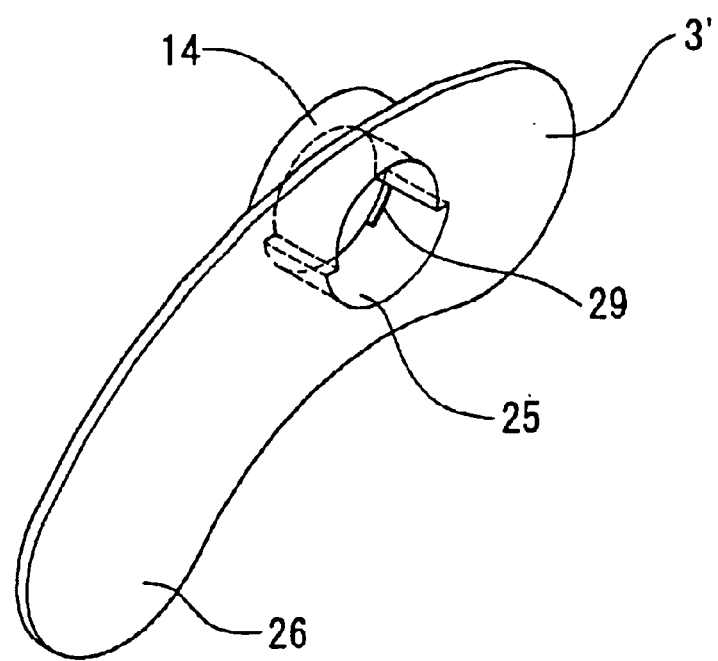
FIG. 8 is a perspective view of the seating member of the second embodiment.
Figure 9:
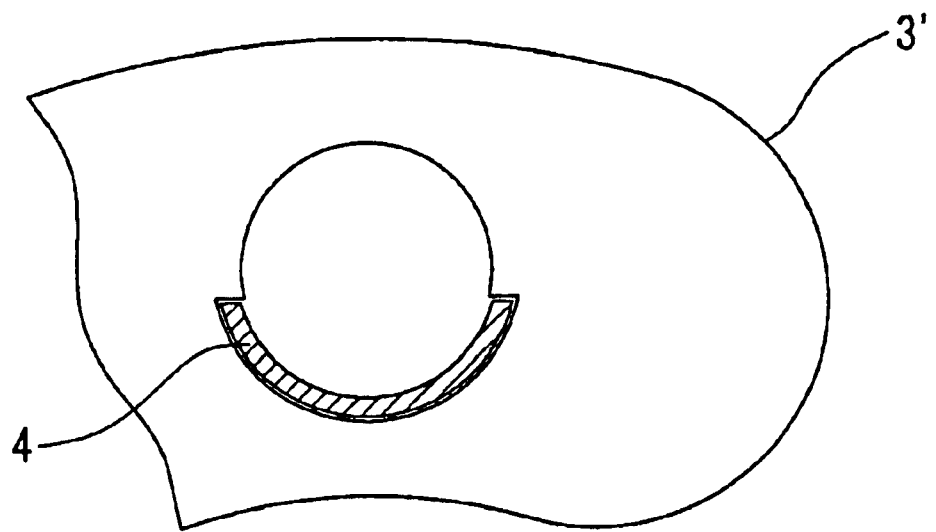
FIG. 9 is a partial enlarged view of the seating member of the second embodiment.

The anchor device of the second embodiment shown in FIGS. 6 and 7 comprises an inserting member 1 having a bag-like portion 6 at the tip of a trough-like trunk portion 4 with an angle relative to the trunk portion 4 through a bendable portion 5, a nut 2 inserted in the bag-like portion 6 and having a threaded hole 8 in its portion protruding from the bag-like portion 6, and a seating member 3' fitted on the trough-like trunk portion 4. It is further provided with retaining means 25 for retaining the seating member 3' so as not to come out of the trough-like trunk portion 4. The retaining means 25 is provided on the inner peripheral surface of the seating member 3' and the outer peripheral surface of the trough-like trunk portion 4. The seating member 3' comprises a cylindrical portion 14 and a thin disk portion 26 provided at one end thereof, and the disk portion 26 has a side elongated in a direction perpendicular to the direction in which the nut 2 protrudes.

On the outer peripheral surface of the trough-like trunk portion 4, a multiplicity of serrations having inclined surfaces gradually increasing height toward the bag-like portion 6 are formed. On the inner periphery of the seating member 3', a protrusion 29 adapted to engage the serrations is provided as a retaining means 25.

The seating member 3' has a through hole for receiving a bolt. Its lower half has a large radius to receive the trough-like trunk portion 4. Its upper half has a smaller diameter than the lower half portion. Thus, the trough-like trunk portion 4 and the seating member 3' rotate integrally. Also, the long side direction of the disk portion 26 and the protruding direction of the nut 2 are kept constants.

Figure 10:
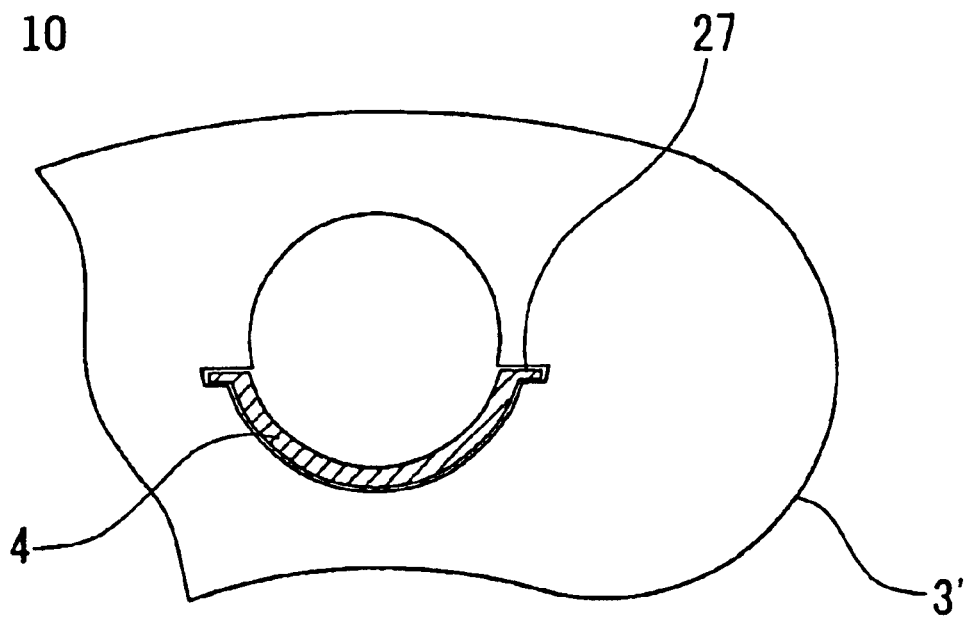
FIG. 10 is a similar view of a modification of the seating member.

As shown in FIG. 10, at the top end of the serrations 19 provided on the outer periphery of the trough-like trunk portion 4, flanges 27 may be provided. In this case, in the seating member 3', recesses for receiving the flanges 27 have to be provided. Due to fitting of the flanges 27 in the recesses of the seating member 3', relative turning between the trough-like trunk portion 4 and the seating member 3' is prevented more stably.

In use, the bag-like portion 6 and the nut 2, which has been inserted into the former, are bent at the bendable portion 5 so as to be parallel to the axis of the trough-like trunk portion 4. In this state, the trough-like trunk portion 4 is inserted into the hole of the wall member with the bag-like portion 6 forward. When the nut 2 and the bag-like portion 6, which is holding the former, reach the back side of the wall member, the bag-like portion 6 will go back to the original position due to restoring resilience of the bendable portion 5. The seating member 3', which is fitted on the trough-like trunk portion 4, is pushed into the hole of the wall member such that the long side direction of its disk portion 26 will extend along the outer periphery of a circular base 28 of the instrument to be fastened. When the trough-like trunk portion 4 is pulled back, the bag-like portion 6 and the nut 2 will abut the back side of the wall member, and due to engagement of the retaining means 25, the seating member 3' will be prevented from coming out. The portion of the trough-like trunk portion 4 protruding from the seating member 3' is cut off.

Next, a bolt is inserted through the seating member 3' into the hole of the wall member so as to extend along the inner periphery of the trough-like trunk portion 4. By threading the bolt into the threaded hole 8 of the nut 2, it is possible to fasten the instrument to be fastened, which has been laid on the front surface of the wall member.

At this time, the circular base of the instrument to be fastened sandwiches the disk portion 26 of the seating member 3' of the anchor device of this invention between itself and the wall member. Due to the thread engagement action of the bolt, even if the nut 2 tends to turn, the bag-like portion 6, which holds the nut 2, the trough-like trunk portion 4, which is integral with the bag-like portion 6, and the seating member 3', which is in engagement with the trough-like trunk portion 4, prevent turning action due to the fixation of the disk portion 26. In particular, since the disk portion 26 having a long side has a sufficiently large size, the effect of fixation by sandwiching is large.

The seating member 3', which has been fitted on the trough-like trunk portion 4, is directed in such a direction that the long side of its disk portion 26 extends along the outer periphery of the circular base 28 of the instrument to be fastened, and pushed into the hole of the wall member, on the back side of the wall member, the nut 2 will face in a radial direction from the center of the circular base of the instrument to be fastened. In this state, when the trough-like trunk portion 4 is pulled back, the bag-like portion 6 and the nut 2 will abut the back side of the wall member while facing in the radial direction from the center of the circular base of the instrument to be fastened. If the instrument is mounted by use of a plurality of such anchor devices, all the nuts will face in radial directions. Thus the area where the nuts contact the wall will increase. This increases the resistance if loads act in a pullout direction.

As described above, according to this invention, the semicolumnar nut is mounted in the bag-like portion, which is provided at the tip of the trough-like trunk portion through the bendable portion, and the engaging means are provided on both edges of the outer periphery of the trough-like trunk portion and the portion of the inner peripheral surface of the seating member where it contacts both edges of the trough-like trunk portion. Thus fastening of an article to be fastened to a portion of which hands cannot reach can be carried out through a small hole formed in the wall surface with a simple structure and operation. Thus it is possible to use a nut having a thick wall thickness. Also, since there is no deformation or breakage due to loads, strong fastening can be obtained.

According to the anchor device of the second embodiment, the nut is mounted in the bag-like portion, which is provided on the tip of the trough-like trunk portion through the bendable portion, and engaging means are provided on the seating member and the trough-like trunk portion. The seating member comprises the cylindrical portion and the thin disk portion provided at one end thereof and the disk portion has a long side elongated in a direction perpendicular to the direction in which the nut protrudes. Thus, it is possible to easily specify the direction of the nut, which is shut off from view in the back of the wall member. In particular, if the base portion of the instrument is disk-like and is fastened with a plurality of bolts, by directing the elongated nuts in such directions that their long sides extend radially from the central point of the base portion, the region where the plurality of nuts contact the board wall will increase, so that the resistance when loads are applied in a pullout direction increases.

What is claimed is:

1. An anchor device comprising:

an inserting member including a trunk shaped substantially as a gutter, and having a longitudinal axis;

a bendable portion;

an end member connected to one end of said trunk through said bendable portion, wherein said end member includes a hole having one end open and another end closed, and having a central axis, wherein said end member is held in a first position such that said central axis forms a predetermined angle relative to said longitudinal axis when said inserting member is not subjected to any external force, and wherein said end member is pivotable, relative to said trunk, from the first position to a second position such that the central axis is substantially parallel to the longitudinal axis by elastically deforming said bendable portion;

a plate-shaped nut having a thickness, wherein said nut includes a threaded hole extending through said nut in a direction of the thickness thereof, and wherein said nut is adapted to be inserted in said hole formed in said end member with said threaded hole located outside of said hole formed in said end member;

a seating member disposed on said trunk; and a retaining member operable to retain said seating member on said trunk.

2. An anchor device as claimed in claim 1, wherein said retaining member comprises a plurality of serrations formed on said trunk continuously in the longitudinal direction on both edges of an outer periphery of said trunk, and a protrusion formed on an inner periphery of said seating member so as to contact with both edges of said trunk.

3. An anchor device as claimed in claim 1, wherein near a bottom of the outer periphery of said trunk, a thin deflecting portion is provided so as to extend in the longitudinal direction.

4. An anchor device as claimed in claim 3, wherein said nut has a substantially semicircular section, wherein said hole of said end member has a semicircular shape, and wherein said end member has a side face facing said bendable portion, said side face being a flat surface.

5. An anchor device as claimed in claim 1, wherein said nut has a substantially semicircular section, wherein said hole of said end member has a semicircular shape, and wherein said end member has a side face facing said bendable portion, said side face being a flat surface.

6. An anchor device as claimed in claim 1, wherein said seating member comprises a cylindrical portion and a thin disk portion provided at one end thereof, said disk portion having a long side elongated in a direction perpendicular to a direction in which said nut protrudes.

7. An anchor device as claimed in claim 1, wherein said seating member comprises a cylindrical portion and a thin disk portion provided at one end thereof, said disk portion having a long side elongated in a direction perpendicular to a direction in which said nut protrudes and is bent in the direction in which said nut protrudes.

8. An anchor device as claimed in claim 1, comprising only one inserting member, wherein said inserting member comprises only one trunk.

* * * * *